(12) United States Patent
Tutin et al.

(10) Patent No.: US 6,906,130 B2
(45) Date of Patent: Jun. 14, 2005

(54) INVERTED NOVOLAC RESIN-TYPE INSULATION BINDER

(75) Inventors: Kim Tutin, Stone Mountain, GA (US); Kurt Gabrielson, Lilburn, GA (US); Jesse Petrella, McDonough, GA (US); Michael Bryant, Acworth, GA (US); Carl White, Conyers, GA (US); Hayes Ingram, Conyers, GA (US); Edward Lucas, Jr., Asbury, WV (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 203 days.

(21) Appl. No.: 10/282,238

(22) Filed: Oct. 29, 2002

(65) Prior Publication Data

US 2004/0082713 A1 Apr. 29, 2004

(51) Int. Cl.$^7$ .............................. C08J 3/00; C08K 3/20; C08L 61/00; C08L 61/22; B32B 3/26

(52) U.S. Cl. ................ 524/596; 428/312.6; 428/317.1; 524/594; 524/595; 524/597; 524/841

(58) Field of Search ........................ 428/312.6, 317.1; 524/594, 595, 596, 597, 841

(56) References Cited

U.S. PATENT DOCUMENTS

| 4,028,367 A | 6/1977 | Higginbottom |
| 2001/0036996 A1 | 11/2001 | Bristol |

*Primary Examiner*—Patrick D. Niland
(74) *Attorney, Agent, or Firm*—Banner & Witcoff, Ltd.

(57) ABSTRACT

A substantially infinitely water-dilutable resole (P:F) resin solution useful for preparing an aqueous binder composition and the related method of its use for making glass fiber products, especially fiberglass insulation.

11 Claims, No Drawings

INVERTED NOVOLAC RESIN-TYPE INSULATION BINDER

FIELD OF THE INVENTION

The present invention relates to a stable aqueous solution of a phenol-formaldehyde resole resin, to a process for preparing the resin solution, to the use of the resole resin in a binder composition for making fiberglass insulation and related fiberglass products (glass fiber products) and to the glass fiber products themselves.

BACKGROUND OF THE INVENTION

Phenol-formaldehyde (PF) resins, as well as PF resins extended with urea (PFU resins), have been the mainstays of fiberglass insulation binder technology over the past several years. Such resins are inexpensive and provide the cured fiberglass insulation product with excellent physical properties.

Some of the drawbacks of this technology, however, are the potential for formaldehyde emissions during the manufacturing of the fiberglass insulation and the crystallization of bis (4-hydroxy-3,5-dimethylolphenol) methane (tetradimer) from the PF resin as its formaldehyde content is reduced below 3 percent. The tetradimer crystal phase is difficult to re-dissolve and contributes to a variety of processing problems not the least of which is plugging in piping and spraying equipment.

Fiberglass insulation is typically made by spaying a dilute aqueous solution of the PF or PFU resin binder onto a moving mat or blanket of non-woven glass fibers, often hot from being recently formed, and then heating the mat or blanket to an elevated temperature in an oven to cure the resin. As a result, free phenol and free formaldehyde in the resin can easily volatilize during use. Manufacturing facilities using PF and PFU resins as the main binder component for insulation products have had to invest in pollution abatement equipment to minimize the possible exposure of workers to such emissions and to meet Maximum Achieveable Control Technology (MACT) requirement Standards.

Higginbottom U.S. Pat. No. 4,028,367 describes an aqueous resole resin composition that is purportedly stable with respect to the unwanted crystallization of tetradimer (bis (4-hydroxy-3,5-dimethylol)methane)) and is low in free phenol and free formaldehyde. Such a resin would appear to be ideally suited for use in making fiberglass insulation.

In particular, the resole resin of the Higginbottom patent has a pH less than 8.5, contains less than 2 percent free phenol and less than 2 percent free formaldehyde and has a number average molecular weight of less than 300. The resole is prepared at a combined formaldehyde to phenol (F:P) mole ratio in the range of 2:1 to 2.9:1. In each of the Examples the combined F:P mole ratio was below 2.4.

According to the Higginbottom patent, this aqueous resole composition is prepared using a two-step process. First, a molar excess of phenol is reacted with formaldehyde (1 mole phenol with 0.05 to 0.3 mole formaldehyde) under an acidic condition sufficient to form a novolac resin. Thereafter, additional formaldehyde is added (broadly described as 1.75 to 3.5 moles per mole of original phenol), and reacted under basic conditions to yield the resole resin. In each of the Examples the total amount of formaldehyde actually added per mole of original phenol was below 3.0 moles. The level of free formaldehyde in the resole is then further reduced by adding a formaldehyde scavenger near the end of the resole reaction in an amount of 0.5 to 1.5 mole equivalents per mole of free formaldehyde. Urea is one of several options disclosed.

The novolac reaction step is conducted at a temperature broadly in the range of 60° to 200° C., depending on the catalyst used. A typical temperature is in the range of 100° to 120° C. Under these conditions, the patent indicates that a sizable population of 2,2'- and 2,4'-dihydroxydiphenylmethanes are produced along with the minor amounts of the 4,4'-dimer. The Higginbottom patent advises against using lower novolac reaction temperatures, as this produces a much greater amount of the less desirable 4,4'-dimer (See col. 3, lines 11–15).

In order to initiate the formation of the resole resin following the novolac chemistry, a base is added to neutralize any acid used in making the novolac and then 0.05 to 0.3 mole equivalent of additional base per mole of original phenol is added above the amount needed to neutralize the acid. The resole reaction is conducted at a temperature broadly in the range of 40° to 80° C. A preferred temperature is in the range of 50° to 70° C. and each of the Examples actually is prepared in the range of 60° to 70° C. These temperatures are said to provide an adequate rate of reaction without excessive oligomerization of the resole. At the end of the resole reaction, the base is neutralized to obtain an aqueous composition at a pH between 6 and 8.5, preferably between 7 and 8.

The larger amount of the methylolated 2,2'-hydroxy and the 2,4'-hydroxy diphenylmethane species purportedly produced by the Higginbottom process is said to help suppress crystallization of the tetradimer (bis (4-hydroxy-3,5-dimethylolphenyl)methane), allowing the level of free (unreacted) formaldehyde to be reduced almost completely in the resole, often through the use of a formaldehyde scavenger.

The resole resin obtained by the process of the Higginbottom patent is said to have a water tolerance in the range of 100 to 800 percent, i.e., haze occurs when an amount of water from 1 to up to about 8 times the amount (mass) of resole is added to the resin. It is this latter property that interferes with the widespread use of the Higginbottom resole resin for making fiberglass insulation.

Because it is preferred that the resole resins used in making a binder composition for producing glass fiber insulation be significantly diluted before use, it would be desirable to have a resole resin with improved water dilution properties relative to the prior art Higginbottom resole. The present invention accomplishes that goal, making the resole resin solution of this invention easier for glass fiber insulation plants to use.

The present invention accomplishes this result while avoiding the complications caused by tetradimer (bis (4-hydroxy-3,5-dihydroxymethylphenyl) methane) precipitation (crystallization) that generally accompanies resole resins made at elevated F:P mole ratios using traditional methods and at low levels of free formaldehyde. The low amount of tetradimer in the resole resin of the present invention results in binder compositions that avoid spray nozzle plugging problems and short shelf-life.

U.S. Published Patent Application 20010036996 describes a highly urea-extended phenol-formaldehyde (PF) resin wherein the PF resin is made at an initial formaldehyde to phenol molar ratio of greater than 3.75:1.

DETAILED DESCRIPTION OF THE INVENTION

The present invention is directed to a resole resin (resin solution) that is essentially infinitely water dilutable and is intended to be used in making a binder composition for producing glass fiber insulation. The resole resin has a low tetradimer content and a low level of free phenol, less than about 1.5% by weight of resin solids. The resole resin is particularly suitable for extension with urea, as the formaldehyde content is generally above 16% by weight of resin solids. Unlike the resole resin of the Higginbottom patent, the resole resin of the present invention is essentially infinitely water dilutable.

The present invention also is directed to a process for making a resole resin that is infinitely water dilutable wherein a low molecular weight novolac resin is used as a source of phenol for the preparation of the resole resin.

In another aspect, the present invention is directed to an aqueous binder composition, particularly useful for making fiberglass insulation and especially a PFU-based binder, wherein the binder contains a substantially infinitely water-dilutable resole resin.

In yet another aspect, the present invention provides a method for binding together a loosely associated mat or blanket of glass fibers, which method comprises (1) contacting said glass fibers with a binder composition containing a substantially infinitely water-dilutable resole resin, as defined above, and (2) heating said glass fibers, having the binder composition adhered thereto, at an elevated temperature, which temperature is sufficient to effect cure of the binder.

Preferably, curing is effected at a temperature from 75° C. to 300° C. usually at a temperature less than 250° C.

In still another aspect, the present invention provides a glass fiber product, especially a glass fiber insulation product, comprising a crosslinked (cured) composition obtained by curing a binder composition containing a substantially infinitely water-dilutable resole resin, as defined above, applied to a mat or blanket of nonwoven glass fibers, preferably a mat or blanket of principally glass fibers and especially a mat or blanket of only glass fibers.

In use, a binder composition made with the resole resin of the present invention, especially a urea-extended resin, is applied as a dilute aqueous solution to a mat of glass fibers and cured by heat.

As used herein, "curing," "cured" and similar terms are intended to embrace the structural and/or morphological change which occurs in the aqueous binder of the present invention as it is dried and then heated to cause the properties of a flexible, porous substrate, such as a mat or blanket of glass fibers to which an effective amount of the binder has been applied, to be altered such as, for example, by covalent chemical reaction, ionic interaction or clustering, improved adhesion to the substrate, phase transformation or inversion, and hydrogen bonding.

As used herein, "aqueous" includes water and mixtures composed substantially of water and water-miscible solvents.

As used herein the phrases "glass fiber," "fiberglass" and the like are intended to embrace heat-resistant fibers suitable for withstanding elevated temperatures such as mineral fibers, aramid fibers, ceramic fibers, metal fibers, carbon fibers, polyimide fibers, certain polyester fibers, rayon fibers, and especially glass fibers. Such fibers are substantially unaffected by exposure to temperatures above about 120° C. If intended to embrace predominately and/or only fibers made from glass, i.e., a material made predominately from silica, then a phrase such as "principally glass fiber" or "only glass fiber," respectively will be used.

As used throughout the specification and claims, the terms mat and blanket are used somewhat interchangeably to embrace a variety of glass fiber substrates of a range of thickness and density, made by entangling short staple fibers, long continuous fibers and mixtures thereof.

As used herein, the term "water dilutability" refers to an amount of water that can be added to the resole resin of the present invention without causing the formation of haze. Often referred to in the art as water tolerance, the water dilutability of a resole resin is determined at 25° C. by the addition of water to the resole resin until a slight permanent haze forms. The level of dilutability is the weight (mass) of water expressed as a percent by weight of the resole resin solids. Thus, if the haze point occurs when 100 parts by weight of water impart haze to 10 parts by weight of resole resin solids, the dilutability is 1000 percent. The resoles of the present invention have an essentially infinite water dilutability, which is meant to embrace a water dilutability of at least 5000 percent.

The essentially infinitely water-dilutable resole resin of the present invention is manufactured by a carefully controlled two-stage process, which produces a resole resin of good storage stability. Because of the high ratio of formaldehyde to phenol (cumulative F:P of 3.5:1 and greater) ultimately used in preparing the resin and as a consequence of the two-stage reaction procedure, the free phenol content of the resole resin solution is reduced to a low value of less than about 1.5 weight percent of resin solids, preferably less than about 0.7% by weight of resin solids, while the free formaldehyde content is above 16% by weight of resin solids and generally above about 23% by weight of resin solids, before addition of formaldehyde scavengers. The free formaldehyde content then is reduced to a low level by adding a formaldehyde scavenger, preferably urea, sometime prior to use of the resin.

In the first step, an acid catalyzed novolac resin is produced at a low F:P mole ratio (0.01:1 to 0.3:1). Preferably, the novolac resin is prepared at a F:P mole ratio of 0.5 to 0.25. At these low formaldehyde to phenol mole ratios, dimer formation is favored and the formation of higher oligomers is suppressed.

The acid catalyst used in the first step reaction is preferably a strong acid catalyst, i.e., an acid having a pKa of 2.0 or less, such as sulfuric acid, oxalic acid, hydrochloric acid, sulfamic acid, benzene sulfonic acid, toluene sulfonic acid or trifluoroacetic acid. Acid salts are also contemplated, especially salts of a divalent metal such as zinc chloride, zinc acetate, zinc oxide and lead octoate. Salts of carboxylic acids conventionally used for the preparation of high ortho novolacs also can be employed. The concentration of acid catalyst generally is in the range of 0.001 to 0.05 mole equivalents per mole of phenol.

In the first step reaction, a solution of phenol and acid catalyst is heated to a temperature of about 90° C. and then the formaldehyde is added in a controlled manner and with sufficient cooling to maintain the reaction temperature in the range of 90° to 100° C.

The primary reaction products of the first reaction step are isomers of bisphenol F, (o,o' and p,p' and o,p'). Consequently, in the broad practice of this invention, the novolac synthesis first reaction step can be dispensed with and the novolac replaced by directly using a solution of bisphenol F in phenol, containing at least about 15% free phenol, preferably containing about 50% free phenol.

For that reason the term "novolac resin" when used in the specification and claims of this application embraces both (1) the reaction product of phenol and formaldehyde in the presence of an acid catalyst (as described above) at a low F:P mole ratio in the range of 0.01:1 to 0.3:1 (preferably 0.05:1 to 0.25:1) and (2) a bisphenol F in phenol solution containing at least 15% free phenol, and preferably containing at least about 50% free phenol.

The novolac resin is cooled, as needed to about 55° C. and if necessary it is neutralized (to a pH of about 7.0). Following any necessary neutralization of the novolac, usually from 0.05 to 0.35 mole of base catalyst per mole of original phenol in the reaction solution is added and a resole reaction is conducted below about 60° C., preferably at about 550° C. Care should be exercised during the addition of base catalyst to ensure that the heat of neutralization does not cause excessive heating. Cooling may be required.

The base for the resole reaction step is a conventional basic catalyst typically having a pK of greater than 9, which is soluble in the reaction medium. Known bases for making resole resins include alkali metal hydroxides such as lithium hydroxide, sodium hydroxide and potassium hydroxide; alkali metal carbonates such as sodium carbonate and potassium carbonate; alkaline earth hydroxides such as magnesium hydroxide, calcium hydroxide and barium hydroxide; aqueous ammonia and amines of molecular weight less than 300.

The remaining formaldehyde then is added as quickly as possible to the reaction solution. However, since it is important to maintain the temperature at or below 55° C. during the formaldehyde addition, the formaldehyde addition preferably is done in a controlled fashion. Since the alkaline catalyst is already in the resin, this is potentially a very exothermic step. The methylolation reaction starts as soon as formaldehyde is added. This step is often referred to as "programming" the formaldehyde into the resin. It is a key feature of the invention that the temperature during the resole reaction is limited to a temperature below about 60° C. and preferably at a temperature of about 55° C., in order to make a low molecular weight resin and obtain maximum methylolation of the phenolic core, rather than causing linking condensation reactions that build molecular weight. As a result, cooling often is required during this reaction.

The final (cumulative) F:P mole ratio is at least 3.5:1, and preferably is at least about 3.7:1 in order to establish reaction conditions during the resole formation reactions favoring maximum methylolation of the dimers (bisphenol F isomers) introduced via the novolac resin from the initial reaction step.

Thus, a key feature of the present invention involves conducting the formation of the resole resin using the combination of a resole resin reaction temperature and a cumulative F:P mole ratio that is below the temperature used in all of the actual examples shown in the Higginbottom patent and above the mole ratio used in all of the actual examples shown in the Higginbottom patent, respectively. In this way, the end point of the resole reaction results is a resole resin having a free formaldehyde content significantly above that obtained in the Higginbottom patent and a suitably low tetradimer content. As used throughout the specification and claims, the phrase "low tetradimer content" means an amount of tertradimer below about 27% by weight of resin solids. Preferably, the amount of tetradimer is below about 23% by weight of resin solids.

The resole reaction is conducted (continued) to the desired free phenol content (less than about 0.1.5% by weight of resin solids and preferably less than about 0.7% by weight of resin solids) and free formaldehyde content (greater than 16% by weight of resin solids, usually greater than about 23% by weight of resin solids) endpoints and then the resole resin is rapidly cooled. Another key feature of the present invention is to limit the extent of the resole reaction to a free formaldehyde endpoint that is significantly higher in residual free formaldehyde content than taught by the Higginbottom patent. Typically, the resole resin has a free formaldehyde concentration, before the addition of any formaldehyde scavenger, of above 16% by weight of resin solids and often (preferably) above about 23% by weight of resin solids and up to about 37% by weight of resin solids. In the Examples of the Higginbottom patent, the level of free formaldehyde in the resole resin solution (before the addition of any formaldehyde scavenger) was 13.2% by weight of resin solids or less and was usually below about 7.1% by weight of resin solids.

The resole resin solution then is neutralized to a pH in the range of 8.0 to 9.5 using an acid such as sulfamic acid, sulfuric acid, maleic acid, and the like.

The present invention ultimately uses more formaldehyde scavenger, preferably urea, to reduce free formaldehyde to a desired level in the final resole resin binder solution than would be used in treating a resole resin of the Higginbottom patent. This reduces the cost of the binder, making it more suitable for use in making fiberglass insulation.

Suitable formaldehyde scavengers include urea, melamine, ammonium hydroxide (ammonia), sodium sulfite, sodium cyanide, other nitrogen containing organic compounds soluble in the resole, having a molecular weight less than 300, containing at least one NH group per molecule reactive with formaldehyde, or some combination of these materials. Examples include primary and secondary amines, substituted ureas, primary amides, dicyandiamide, guanidines and other aminotriazines such as guanamine and benzo-guanamine. Sufficient formaldehyde scavenger is added to reduce the free formaldehyde content of the resin to a low level. As recognized by those skilled in the art, it is preferred to use about 0.5 to 1.5 mole equivalents of scavenger per mole of free formaldehyde remaining at the end of the resole reaction and to conduct the reaction between scavenge and free formaldehyde at a temperature of 20° to 60° C. to minimize oligomerization of the resole resin. Preferably, urea is used as the sole scavenger in an amount of 0.6 to 1.25 mole equivalents of scavenger per mole of free formaldehyde.

In operation, the P:F resole resin of the present invention is formulated into a dilute aqueous binder solution and the binder then is usually applied to glass fibers as they are being produced and formed into a mat or blanket. Water is volatilized from the binder as it contacts the hot fibers, and the high-solids bindercoated fibrous glass mat is heated to cure the binder and thereby produce a finished glass fiber product, e.g., fiberglass insulation product.

The resole resin can readily be made into an aqueous binder composition (usually at the site where the binder will be used) by first adding the formaldehyde scavenger, usually urea and allowing the scavenger time to pre-react, usually for about 3 to 16 hours, with the resole resin.

Following this pre-reaction with scavenger, the resole resin is diluted with additional water and other binder ingredients are added. The aqueous resole resins of this invention can be diluted with water far beyond the limits of the resole resin made in accordance with the Higginbottom patent. The combination of formaldehyde scavenging and water dilution reduces the free formaldehyde content in the binder composition to less than 1.2% by weight of resin solids.

Fortunately, the manner in which the resole resin of the present invention is produced results in low levels of tetradimer (bis (4-hydroxy-3,5-dihydroxymethylphenyl) methane), which would otherwise precipitate (crystallize) from the binder composition under such circumstances. As a consequence of how it is produced, the resole resin of the present invention avoids such problems.

The resole resin of the present invention can be easily blended with other ingredients and diluted to a low concentration for making the aqueous binder composition, which can then be sprayed onto the fibers as they fall onto the collecting conveyor. The binder composition is generally applied in an amount such that the cured binder constitutes about 5 wt. % to about 15 wt. % of the finished glass fiber products, e.g., fiberglass insulation product, although it can be as little as 1 wt. % or less and as high as 20 wt. % or more, depending upon the type of glass fiber product. Optimally, the amount of binder for most thermal insulation products will be the amount necessary to lock each fiber into the mass by bonding the fibers where they cross or overlap. For this reason, it is desired to have binder compositions with good flow characteristics, so that the binder solution can be applied to the fiber at a low volume that will flow to the fiber intersections.

The binder formulation needs to be stable for periods of time long enough to permit mixing and application to the glass fibers at temperatures ordinarily encountered in glass fiber product manufacturing facilities, such as fiberglass insulation product manufacturing plants. Such times are typically greater than 4 hours. Alternatively, if the glass fiber manufacturer has an in-line binder mixing system, the P:F resin solution may be diluted and immediately applied to the fibers. In this circumstance, stability may be less of a concern.

To prepare a binder formulation, it may also be advantageous to add a silane coupling agent (e.g., organo silicon oil) to the P:F resole resin solution in an amount of at least about 0.05 wt. % based on the weight of binder solids. Suitable silane coupling agents (organo silicon oils and fluids) have been marketed by the Dow-Coming Corporation, Petrarch Systems, and by the General Electric Company. Their formulation and manufacture are well known such that detailed description thereof need not be given. When employed in the binder composition of this invention, the silane coupling agents typically are present in an amount within the range of about 0.1 to about 2.0 percent by weight based upon the binder solids and preferably in an amount within the range of 0.1 to 0.5 percent by weight. Representative silane coupling agents are the organo silicon oils marketed by Dow-Coming Corporation; A0700, A0750 and A0800 marketed by Petrarch Systems and A1100 (an amino propyl, trimethoxy silane) or A1160 marketed by Dow Chemical Corporation. This invention is not directed to and thus is not limited to the use of any particular silane additives.

The binder may be prepared by combining the P:F resole resin and the silane coupling agent in a relatively easy mixing procedure carried out at ambient temperatures. The binder can be used immediately and may be diluted with water to a concentration suitable for the desired method of application, such as by spraying onto the glass fibers.

Other conventional binder additives compatible with the P:F resole resin and silane coupling agent also may be added to the binder destined for application to the glass fibers. Such additives include such conventional treatment components as, for example, emulsifiers, pigments, fillers, lignin, anti-migration aids, curing agents, coalescents, wetting agents, dedusting agents, biocides, plasticizers, anti-foaming agents, colorants, such as carbon black, waxes, and anti-oxidants Often a latent catalyst also is added (and if fact is used almost all the time in actual practice), though its use in the broad practice of the present invention generally is optional. The latent catalyst most often used in the industry is ammonium sulfate, but ammonium salts of another strong acids could alternatively be employed. Such catalysts are often added in an amount of about 2.5 to 8.0% by weight of the binder solids content.

The particular method for forming glass fibers for use in the present invention is relatively unimportant. Processes for making glass fiber products, and especially fiberglass insulation products using a binder composition based on the resole resin of the present invention are typically carried out according to one of a number of methods wherein a molten mineral material flowing from a melting furnace is divided into streams and attenuated into fibers. The attenuation can be done by centrifuging and/or by fluid jets to form discontinuous fibers of relatively small dimensions which typically are collected by randomly depositing on a moving foraminous (porous) conveyor belt. The fibers are collected in a felted haphazard manner to form a mat. The volume of fiber in the mat (including diameters and lengths) will be determined by the speed of fiber formation and the speed of the belt.

Continuous glass fibers also may be employed in the form of mats or blankets fabricated by swirling the endless filaments or strands of continuous fibers, or they may be chopped or cut to shorter lengths for mat or batt formation. Use can also be made of ultra-fine fibers formed by the attenuation of glass rods. Also, such fibers may be treated with a size, anchoring agent or other modifying agent before use.

Glass fiber insulation products may also contain fibers that are not in themselves heat-resistant such as, for example, certain polyester fibers, rayon fibers, nylon fibers, and superabsorbent fibers, in so far as they do not materially adversely affect the performance of the glass fiber product.

In order to produce most glass fiber products and especially fiberglass thermal insulation products, the fibers must be bonded together in an integral structure. To achieve this binding, a binder based on the curable P:F resole resin of the present invention is applied to the glass fiber mat or blanket. When making fiberglass insulation, the layer of fiber with binder is then mildly compressed and shaped into the form and dimensions of the desired thermal insulation product. The insulation product then is passed through a curing oven where the binder is cured fixing the size and shape of the finished insulation product.

The binder composition prepared using the resole resin of the present invention may be applied to the fiberglass by conventional techniques such as, for example, air or airless spraying, padding, saturating, roll coating, curtain coating, beater deposition, and coagulation. For example, the binder composition can be applied to the glass fibers by flooding the collected mat of glass fibers and draining off the excess, by applying the binder composition onto the glass fibers during mat or blanket formation, by spraying the glass fiber mat or the like. As noted above, the layer of fiber with binder can then be mildly compressed and shaped into the form and dimensions of the desired insulation product such as pipe, batt or board and passed through a curing oven where the binder is cured, thus fixing the size and shape of the finished insulating product by bonding the mass of fibers one to another and forming an integral composite structure.

The aqueous binder comporsition, after it is applied to the glass fiber, is heated to effect drying and curing. The duration and temperature of heating will affect the rate of drying, processability and handleability, degree of curing and property development of the treated substrate. The curing temperatures are within the range from 100 to 300° C., preferably within the range from 150 to 250° C. and the curing time will usually be somewhere between 3 seconds to about 15 minutes.

On heating, water present in the binder composition evaporates, and the composition undergoes curing. These processes can take place in succession or simultaneously. Curing in the present context is to be understood as meaning the chemical alteration of the composition, for example crosslinking through formation to covalent bonds between the various constituents of the composition, formation of ionic interactions and clusters, formation of hydrogen bonds. Furthermore, the curing can be accompanied by physical changes in the binder, for example phase transitions or phase inversion.

As noted, the drying and curing functions may be accomplished in two or more distinct steps, if desired. For example, the composition may be first heated at a temperature and for a time sufficient to substantially dry but not to substantially cure the binder composition and then heated for a second time at a higher temperature and/or for a longer period of time to effect curing. Such a procedure, referred to as "B-staging", may be used to provide binder-treated product, for example, in roll form, which may at a later stage be cured, with or without forming or molding into a particular configuration, concurrent with the curing process. This makes it possible, for example, to use the compositions of this invention for producing binder-impregnated semi-fabricates, which can be molded and cured elsewhere. The uncured B-staged material often may be stored for up to two months before final curing.

The glass fiber component will represent the principal material of the glass fiber products, such as a fiberglass insulation product. Usually 99–60 percent by weight of the product will be composed of the glass fibers, while the amount of P:F resole resin binder solids will broadly be in reverse proportion ranging from 1–40 percent, depending upon the density and character of the product. Glass insulations having a density less than one pound per cubic foot may be formed with binders present in the lower range of concentrations while molded or compressed products having a density as high as 30–40 pounds per cubic foot can be fabricated of systems embodying the binder composition in the higher proportion of the described range.

Glass fiber products can be formed as a relatively thin product, such as a mat having a thickness of about 10 to 50 mils; or they can be formed as a relatively thick product, such as a blanket of 12 to 14 inches or more. Glass fiber products of any thickness are embraced by the present invention. The time and temperature for cure for any particular glass fiber product will depend in part on the amount of binder in the final structure and the thickness and density of the structure that is formed and can be determined by one skilled in the art using only routine testing. For a structure having a thickness ranging from 10 mils to 1.5 inch, a cure time ranging from several seconds to 1–5 minutes usually will be sufficient at a cure temperature within the range of 175°–300° C.

Glass fiber products may be used for applications such as, for example, insulation batts or rolls, as reinforcing mat for roofing or flooring applications, as roving, as microglass-based substrate for printed circuit boards or battery separators, as filter stock, as tape stock, and as reinforcement scrim in cementitious and noncementitious coatings for masonry.

Generally, insulation blankets are cut into the desired size and shape immediately following binder cure, compressed, packaged and shipped to distribution locations.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

EXAMPLE 1

Step 1 Novolac Resin Preparation

A novolac resin was prepared at a, F:P mole ratio of 0.15:1 as follows. About 91 parts by weight phenol and 0.1 part by weight of concentrated sulfuric acid were blended with about 0.3 parts by weight water in a suitable reaction vessel equipped with reflux (for cooling), a heater, and a mixer. The contents of the reactor were heated to about 85° C. and about 8.7 parts by weight of a 50 weight percent aqueous formaldehyde solution were added over 30 minutes, while limiting the temperature increase to a maximum temperature of 95° C. The reaction was allowed to continue at 95° C. until the level of free phenol stabilized. Once the level of free phenol stopped decreasing, the novolac resin in the reactor was cooled and recovered. The novolac resin had a free phenol content of about 67%.

EXAMPLE 2

Step 2 Resole Resin Preparation

The novolac resin of Example 1 (30.5 parts by weight) was heated to 55° C. Over a 20 minute period 3.5 parts of a 50% aqueous solution of sodium hydroxide was added to the novolac resin, while maintaining the temperature of the resin at 55° C. Next, while continuing to hold the temperature at 55° C., 64.5 parts of a 50 weight percent aqueous solution of formaldehyde were added over a 60 minute time period. This resulted in a cumulative F:P mole ratio of about 3.8. The reaction mixture then was heated to 63° C. over a 20 minute period and then held at that temperature for 1 additional hour. Thereafter, the reaction mixture was cooled to 55° C. and held at that temperature until achieving a free phenol content of about 0.22%. Then, the resole resin solution was cooled to 50° C., 1.46 parts of sulfamic acid were added and the solution was cooled further to 40° C. The pH was measured and additional sulfamic acid was added, as needed, to reduce the resole resin solution pH to 8.6 to 8.9. Once the desired pH had been obtained the resole resin solution was cooled to 25° C.

The resulting resole resin solution produced in this manner, having a non-volatile content of about 44%, exhibited a free formaldehyde content of about 11.4% (26% by weight resin solids), contained about 9.9% tetradimer (22.5% by weight resin solids) and 0.19% free phenol (0.43% by weight resin solids) and had a water dilutability of over 5000%.

For comparison, a traditional resole resin prepared under similar conditions at an F:P mole ratio of about 4.0, also having a non-volatile content of about 44% and a water dilutability of over 5000%, exhibited a free formaldehyde content of about 12.2% (27.7% by weight of resin solids) and contained about 14.7% tetradimer (34.4% by weight of resin solids) and 0.21% free phenol (0.48% by weight of resin solids).

EXAMPLE 3

Step 1 Novolac Resin Preparation

A novolac resin was prepared at a, F:P mole ratio of 0.10:1 as follows. About 93.6 parts by weight phenol and about 0.1 part by weight of concentrated sulfuric acid were bended with about 0.31 parts by weight water in a suitable reaction vessel equipped with reflux (for cooling), a heater, and a mixer. The contents of the reactor were heated to about 85° C. and about 5.97 parts by weight of a 50 weight percent aqueous formaldehyde solution were added over 30 minutes, while limiting the temperature increase to a maximum temperature of 95° C. The reaction was allowed to continue at 95° C. until the level of free phenol stabilized. Once the level of free phenol stopped decreasing, the novolac resin in the reactor was cooled and recovered. The novolac had a free phenol content of about 75%.

EXAMPLE 4

Step 2 Resole Resin Preparation

A 0.1 F:P novolac resin (similar to Example 3) in an amount of about 30 parts by weight was heated to 55° C. Over a 20 minute period about 3.5 parts of a 50% aqueous solution of sodium hydroxide was added to the novolac resin, while maintaining the temperature of the resin at 55° C. Next, while continuing to hold the temperature at 55° C., about 60.3 parts of a 50 weight percent aqueous solution of formaldehyde were added over a 60 minute period. This resulted in a cumulative F:P mole ratio of about 3.5. The reaction mixture then was held at 55° C. until the free formaldehyde content dropped to about 11% (24.4% by weight of resin solids) and the free phenol content dropped to about 0.4% (0.89% by weight of resin solids). Then, the pH of the resole resin solution was about 9.1.

The resulting resole resin produced in this manner, had a non-volatile content of about 45% and had a water dilutability of over 5000%.

As used throughout the specification and claims the terms "resin solids" and "non-volatile content" are used interchangeably to mean the solids content of a composition (e.g., resin) determined by measuring the weight loss upon heating a small, e.g., 1–5 gram, sample of the composition at about 105° C. for a period of time of about 3 hours.

The present invention has been described with reference to specific embodiments. However, this application is intended to cover those changes and substitutions that may be made by those skilled in the art without departing from the spirit and the scope of the invention. Unless otherwise specifically indicated, all percentages are by weight. Throughout the specification and in the claims the term "about" is intended to encompass +or −5%.

We claim:

1. A substantially infinitely water-dilutable aqueous resole resin solution having a tetradimer content below about 23% by weight of resin solids and being suitable for making a binder composition for preparing glass fiber products, said resole resin comprising the base catalyzed reaction product, at a reaction temperature below about 60° C., of (i) a novolac resin and (ii) formaldehyde in an amount sufficient to establish a cumulative F:P mole ratio for said resole resin of at least 3.5:1, in order to favor methylolation of dimers present in the novolac resin during production of the resole resin, said resole resin having an amount of free formaldehyde of above 16 wt. % of resin solids and an amount of free phenol below about 1.5 wt. % of resin solids.

2. The resole resin of claim 1 having a pH in the range of 8.0 to 9.5.

3. The resole resin of claim 1 wherein the novolac resin has a formaldehyde to phenol mole ratio of 0.05:1 to 0.25:1.

4. The resole resin of claim 1 wherein the F:P mole ratio for said resole resin is at least about 3.7:1.

5. The resole resin of claim 3 wherein the cumulative F:P mole ratio for said resole resin is at least about 3.7:1.

6. The resole resin of claim 1 wherein the reaction temperature is about 55° C.

7. The resole resin of claim 5 wherein the reaction temperature is about 55° C.

8. A binder composition suitable for binding together a loosely associated mat of glass fibers comprising the resole resin of claim 1, claim 4, claim 5 or claim 7 reacted with urea, in an amount sufficient to provide a urea to free formaldehyde mole ratio in the range of 0.6:1 to 1:1.25.

9. A method for binding together a loosely associated mat of glass fibers comprising (1) contacting said glass fibers with an aqueous binder composition comprising an aqueous solution of substantially infinitely water-dilutable resole resin solution of claim 1, claim 4, claim 5 or claim 7, and (2) heating said aqueous binder composition at an elevated temperature sufficient to effect cure.

10. An glass fiber product comprising a crosslinked (cured) composition obtained by curing an aqueous binder composition comprising an aqueous solution of a substantially infinitely water-dilutable resole resin solution of claim 1, claim 4, claim 5 or claim 7 applied to a mat of nonwoven glass fibers.

11. The glass fiber product of claim 10 wherein the glass fiber product is fiberglass insulation product.

* * * * *